UNITED STATES PATENT OFFICE.

FRANCOIS R. JOLY, OF PARIS, FRANCE.

IMPROVEMENT IN PROCESSES OF DESTROYING VEGETABLE MATTERS IN WOOL AND WOOLEN FABRICS.

Specification forming part of Letters Patent No. 155,802, dated October 13, 1874; application filed August 17, 1874.

*To all whom it may concern:*

Be it known that I, FRANCOIS ROMAIN JOLY, of Paris, France, have invented a certain new and useful Method of Destroying Vegetable Matters in Wool and Woolen Fabrics, of which the following is a specification:

Wool always contains, no matter what precautions may be taken, a certain quantity of vegetable substances, scraps of burrs, &c., of which the fabrics made from such wool should be completely free. It is impracticable to remove by mechanical means all traces of these vegetable products, and it has, therefore, been attempted to obtain the desired result by the action of chemicals, and since acids possess generally the property of attacking and destroying, by preference, vegetable substances when the latter are mingled with animal matters, it has been customary to employ acids for the above operation. But the use of acids is attended with serious inconveniences, especially in the case of wool already colored or dyed, for they quickly affect and alter the color, which has always a vegetable or mineral base, as is well known.

Upon wool, woolen fabrics, or shoddy, they have the injurious effect of thickening the fiber, of decreasing its strength and solidity, as well as ruining the color.

The object of my invention is to obtain, chemically, the incineration of vegetable matter in wool, either raw or in the condition of a fabric, without altering thereby the color, or even the shade of the color, and without thickening or weakening in any way or manner the fiber. In order to obtain this important result, it is necessary to have a chemical substance which will attack and destroy vegetable matters as effectively as acids, but which will have no effect upon mineral and mineral products.

After numerous and long-continued experiments I have attained the above result by the employment of chloride of aluminum, sometimes termed the neutral chlorhydrate of alumina.

The use of the above-named chloride favors considerably the development of the coloring matter, and leaves in the raw wool, or in the woolen fabric, no residuum to interfere with or destroy the perfect uniformity in the shade or tint of the color afterward applied; and if wool or wool fabrics already colored are treated with it the effect is rather to intensify the tints than otherwise. This action is in great contrast to that of acids, or even of certain other products, approaching more nearly that which I employ, but differing therefrom in that they are insoluble in water, said acids or products acting to change or turn the color, or to produce spots or blurs on the fabrics.

My invention may be carried into effect as follows:

For raw wools, immerse the wool in a vessel containing water, to which is added chloride of aluminum, until the bath registers from 3° to 4° Baumé. A higher degree may be raised, however, if desired.

The wool, after remaining in the bath for a proper time, depending upon the amount of vegetable matter in it, is taken out, and is then dried in a drier at a high temperature, being removed therefrom when, on examination, it is determined that the vegetable matter is sufficiently incinerated.

For woolen fabrics, the fabrics, held on a reel or proper holder, are immersed in the bath, which should be from 3° to 5° Baumé, according to the kind of cloth operated on. When the fabrics are well impregnated with the chloride, they should be first dried at a high temperature, and afterward washed.

In conclusion, I would observe that I am aware of the processes described in the Letters Patent to John George Perzel, of September 8, 1863, and to Ruschaupt and Perzel, of July 26, 1864. Those processes are ineffectual to accomplish the result obtained by me. The neutral chloride of zinc, and other chlorides named in said Letters Patent, destroy neither cotton nor other vegetable matter without being first rendered acid, and when so rendered their use is open to the objections above stated, which attend any acid process.

Having described my invention, what I claim, and desire to secure by Letters Patent, is—

The process of treating wool and woolen fabrics, whether raw, or colored, or dyed, and woolen waste for the removal of vegetable matter therefrom by the employment of chloride of aluminum, as herein specified.

In testimony whereof I have signed my name to this specification before two subscribing witnesses.

F. R. JOLY.

Witnesses:
EMILE BARRAULT,
AUG. VINCK.